United States Patent
Rakers

(10) Patent No.: US 9,284,070 B2
(45) Date of Patent: Mar. 15, 2016

(54) PROPELLANT TANK WITH RADIOMETRIC MEASUREMENT OF CONTENT QUANTITY

(71) Applicant: Astrium GmbH, Taufkirchen (DE)

(72) Inventor: Sven Rakers, Thedinghausen (DE)

(73) Assignee: Astrium GmbH, Taufkirchen (DE)

( * ) Notice: Subject to any disclaimer, the term of this patent is extended or adjusted under 35 U.S.C. 154(b) by 343 days.

(21) Appl. No.: 13/900,665

(22) Filed: May 23, 2013

(65) Prior Publication Data

US 2013/0313370 A1    Nov. 28, 2013

(30) Foreign Application Priority Data

May 24, 2012  (DE) .......................... 10 2012 010 628

(51) Int. Cl.
*B64G 1/40* (2006.01)
*G01F 23/288* (2006.01)
*G01F 17/00* (2006.01)

(52) U.S. Cl.
CPC ............... *B64G 1/402* (2013.01); *G01F 17/00* (2013.01); *G01F 23/288* (2013.01)

(58) Field of Classification Search
USPC ........... 244/172.3, 135 R; 250/357.1, 363.01, 250/370.11
See application file for complete search history.

(56) References Cited

U.S. PATENT DOCUMENTS

| | | | |
|---|---|---|---|
| 3,501,632 A | 3/1970 | Kaminskas et al. | |
| 3,531,638 A | 9/1970 | Badgett | |
| 3,717,760 A | 2/1973 | Martin | |
| 4,471,223 A * | 9/1984 | Hurst et al. | 250/357.1 |
| 4,755,677 A | 7/1988 | Blincow et al. | |
| 6,198,103 B1 * | 3/2001 | Houillion et al. | 250/357.1 |
| 6,879,425 B2 * | 4/2005 | Damm et al. | 359/272 |
| 2006/0138330 A1 * | 6/2006 | Baldwin et al. | 250/357.1 |
| 2012/0020457 A1 | 1/2012 | Cahill | |

FOREIGN PATENT DOCUMENTS

| | | |
|---|---|---|
| DE | 699 07 659 | 12/2003 |
| DE | 102008011382 | 9/2009 |
| EP | 1 318 455 | 6/2003 |
| JP | 09-080156 A | 3/1997 |
| WO | WO 00/22387 | 4/2000 |

OTHER PUBLICATIONS

European Search Report for European Application No. EP 13 00 2287, dated Oct. 31, 2013, 2 pages, The Hague, Netherlands, with English translation, 2 pages.

* cited by examiner

*Primary Examiner* — J. Woodrow Eldred
(74) *Attorney, Agent, or Firm* — W. F. Fasse

(57) ABSTRACT

A propellant tank for containing a propellant with a liquid phase, preferably for a satellite, includes a tank shell wrapped or wound with scintillating glass fibers, a gamma radiation emitter arranged preferably in the center of the tank, and photodiodes allocated to the glass fibers. Preferably, plural glass fibers are wound in cylindrically symmetrical sections around the tank, and the winding axis of the glass fibers extends through the tank outlet. The glass fibers scintillate and emit pulses of light in response to being impinged upon by gamma radiation. The quantity and location of liquid propellant in the tank is determined by evaluating the light signals emitted by the glass fibers. The tank shell is preferably fabricated of a lightweight metal such as aluminum or titanium, to minimize gamma radiation absorption in the tank shell wall, and thereby minimize the required emitting magnitude of the gamma radiation source.

18 Claims, 3 Drawing Sheets

PROPELLANT TANK WITH RADIOMETRIC MEASUREMENT OF CONTENT QUANTITY

PRIORITY CLAIM

This application is based on and claims the priority under 35 USC 119 of German Patent Application 10 2012 010 628.9, filed on May 24, 2012, the entire disclosure of which is incorporated herein by reference.

FIELD OF THE INVENTION

The invention relates to a propellant or fuel tank, especially for satellites, for receiving and containing propellants or fuels with a liquid phase.

BACKGROUND INFORMATION

In principle, a satellite should remain capable of maneuvering up to the end of its provided operating life to the extent possible. This is, however, no longer the case, when the propellant is completely used up. Therefore, the satellite must be taken out of operation in a controlled manner, as long as propellant is still available. In satellites the problem exists, however, that in a later operational phase it can no longer be exactly determined how much propellant is still located in the tank, because standard methods, such as weighing, do not function in zero gravity conditions. Moreover, for propellants with a liquid phase, the remaining or residual quantity can also not be measured via the pressure of the gas phase, because the gas phase pressure does not exist according to a fixed relation to the volume or the mass of the liquid phase. Finally, the remaining propellant also cannot always be determined from the difference between the original tank filling and the propellant that has flowed out in the course of the operation of the satellite via a throughflow measurement, because the latter also becomes less accurate over time. Therefore, for safety reasons the deployment duration of a satellite is often already ended before all of the propellant has actually been used up.

The determination of the propellant or fuel quantity in propellant or fuel tanks with the aid of radiometric auxiliary means is already known according to the patent documents U.S. Pat. No. 3,501,632 A and U.S. Pat. No. 4,755,677 A. Besides that, an arrangement of the initially mentioned type with scintillation fiber bundles extending along the container wall has become known for fill level measurement from the patent documents U.S. Pat. No. 4,471,223 A, DE 10 2008 011 382 A1 and DE 699 07 659 T2 as well as once again from U.S. Pat. No. 3,501,632 A. Finally, the patent documents US 2012/0020457 A1, U.S. Pat. No. 4,471,223 A and DE 10 2008 011 382 A respectively describe arrangements of a gamma radiation emitter in the center of a tank, and U.S. Pat. No. 3,531,638 A describes the reversed arrangement of a detector in the center of such a tank.

SUMMARY OF THE INVENTION

In view of the above, it is an object of the invention to further develop and embody a propellant or fuel tank of the initially mentioned type so that at any time an exact detection of the propellant quantity contained in the tank is possible in the simplest manner. The invention further aims to avoid or overcome the disadvantages of the prior art, and to achieve additional advantages, as apparent from the present specification.

The invention achieves the above object in that a tank shell of the propellant tank is wrapped or wound with scintillating glass fibers, a gamma radiation emitter is arranged in (preferably the center of) the propellant tank, and photodiodes are allocated or optically coupled to the glass fibers.

An advantageous further development exists in wrapping or winding plural glass fibers around the tank shell in cylindrically symmetrical sections or spherical segment or slice sections that are divided from one another along planes that extend normal to the winding axis of the glass fibers. Thereby it is possible to obtain or develop tomographic information regarding the quantity and location of liquid propellant masses or blobs within the interior tank space bounded within the tank shell. Namely, this information represents "slices" of the tank, and indicates how much and where the propellant is located in the tank.

In the preferred embodiment of the invention the winding axis of the scintillating glass fibers extends through the tank outlet, so that it can be recognized whether propellant is still located in this area of this outlet. The remaining propellant can then be accelerated toward the outlet by a thrust impulse that acts on the satellite in the direction opposite the propellant outlet.

Moreover, within the scope of the invention it is of special advantage when the propellant tank shell or tank wall is fabricated of a lightweight metal such as aluminum or titanium, because the absorption of the gamma radiation in the tank wall is thereby minimized, and therefore the required radioactive emission activity of the gamma radiation source is held as small as possible.

However, a radiometric measurement as it is provided in the propellant tank according to the invention also has a few disadvantages, which are to be weighed against the useful advantages in the particular utilization or application of the tank, as follows:

A radioactive source must be carried along onboard the satellite, which however does not represent a problem technically and on grounds of environmental protection, because for this purpose only a small quantity of approximately one milligram of a radioactive material is necessary.

Equipping the propellant tank according to the invention with fibers, photosensors or photodetectors, and an evaluation electronics requires an additional mass of approximately one kilogram, so that the satellite with the same mass can only carry a correspondingly reduced quantity of propellant.

A "blind test" is necessary, in order to deduct the radioactive background radiation that will also be received and detected by the scintillating glass fibers and the connected photodetectors. This background radiation can be significant due to the Van Allen belt in certain orbits and can be dependent on the solar activity. The activity, i.e. the radioactive emission magnitude, of the source must be tuned or adapted based on this background.

The radioactive dosing load of the electronics on the satellite is slightly increased due to the radioactive source that is carried along on board the satellite, but the relatively small extra radioactive dosing is not significant.

The most important advantage of a preferred embodiment of the invention is that, due to improved propellant utilization, a satellite equipped with a propellant tank according to the invention can be operated considerably longer, because at all times an exact knowledge about the still-remaining residual quantity of propellant is given, and from that an improved propellant utilization, a longer operating or deployed life, and therewith a significant cost savings result.

The technology of scintillating fibers is, per se by itself, already known and tested for years. So-called avalanche photodiodes are also known and are ever more often replacing the larger and bulkier vacuum photomultipliers.

BRIEF DESCRIPTION OF THE DRAWINGS

In the following, the invention will be explained in further detail in connection with an example embodiment illustrated in the drawings, wherein.

DETAILED DESCRIPTION OF PREFERRED EXAMPLE EMBODIMENTS AND THE BEST MODE OF THE INVENTION

Figure 1:
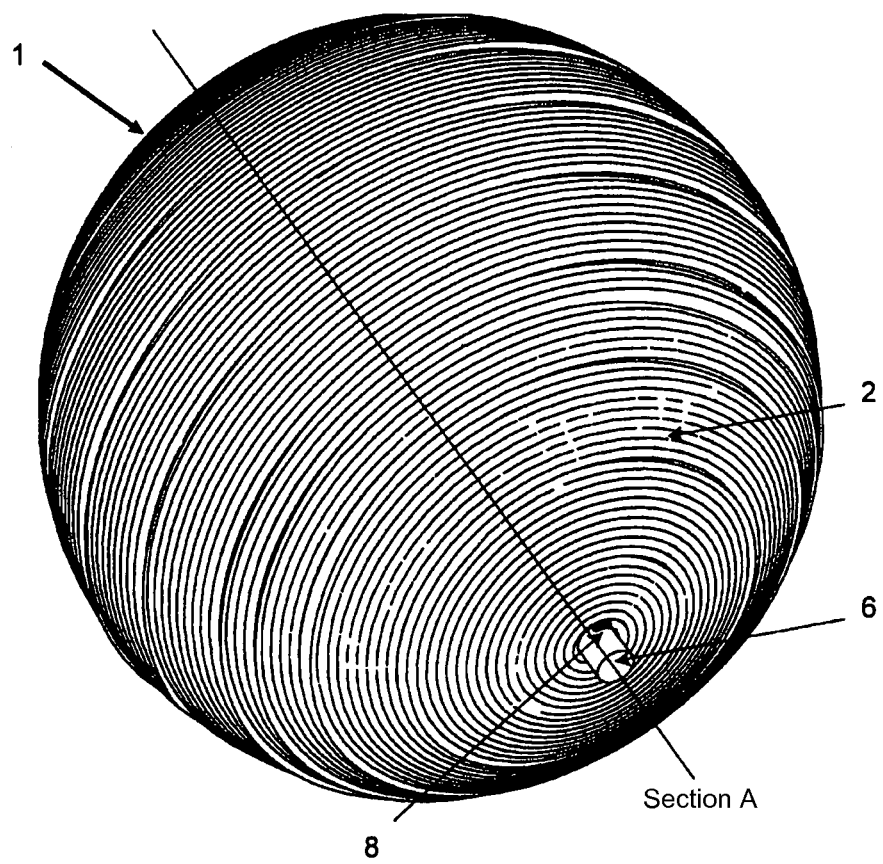
FIG. 1 is a perspective schematic illustration of a spherical propellant tank, wrapped or wound with scintillator fibers, for satellites.

According to the illustration in FIG. 1, a propellant or fuel tank 1 includes a tank shell or tank wall that is wrapped or wound with scintillating glass fibers 2. As can be seen in the sectional illustration in FIG. 2, a gamma radiation emitter 3, in this case a cobalt-60 source, is positioned at the center of the propellant tank 1, which is spherical in the case of the example embodiment described here. When they are impinged by gamma quanta, the scintillating glass fibers 2 scintillate and emit light pulses. These light pulses are coupled out of the fibers 2 into respective allocated photodetectors 8. Namely, the photodetectors 8 are optically coupled to the glass fibers 2, e.g. respectively to an end of each respective fiber, by any known coupling arrangement so that the light pulses (of any pertinent wavelength) from the fibers are coupled into the photodetectors and detected there. Preferably the photodetectors 8 are of the so-called silicon avalanche type of photodiodes in the case of the example embodiment described here. One of the avalanche photodetectors 8 is arranged in the area of an outlet 6 of the propellant tank 1 in the arrangement according to FIG. 1. In the photodetectors 8, the light pulses are converted into electrical pulses, which are then further amplified in a corresponding pre-amplifier electronics (not illustrated), and then the amplified electrical signals are evaluated in a further connected evaluation electronics (not illustrated) in order to determine the quantity and location of masses or blobs of liquid propellant 4 in the tank, as will be described below. The pre-amplifier and the evaluation electronics can respectively be any known circuit, device or arrangement for achieving the required amplification and evaluation.

Figure 2:
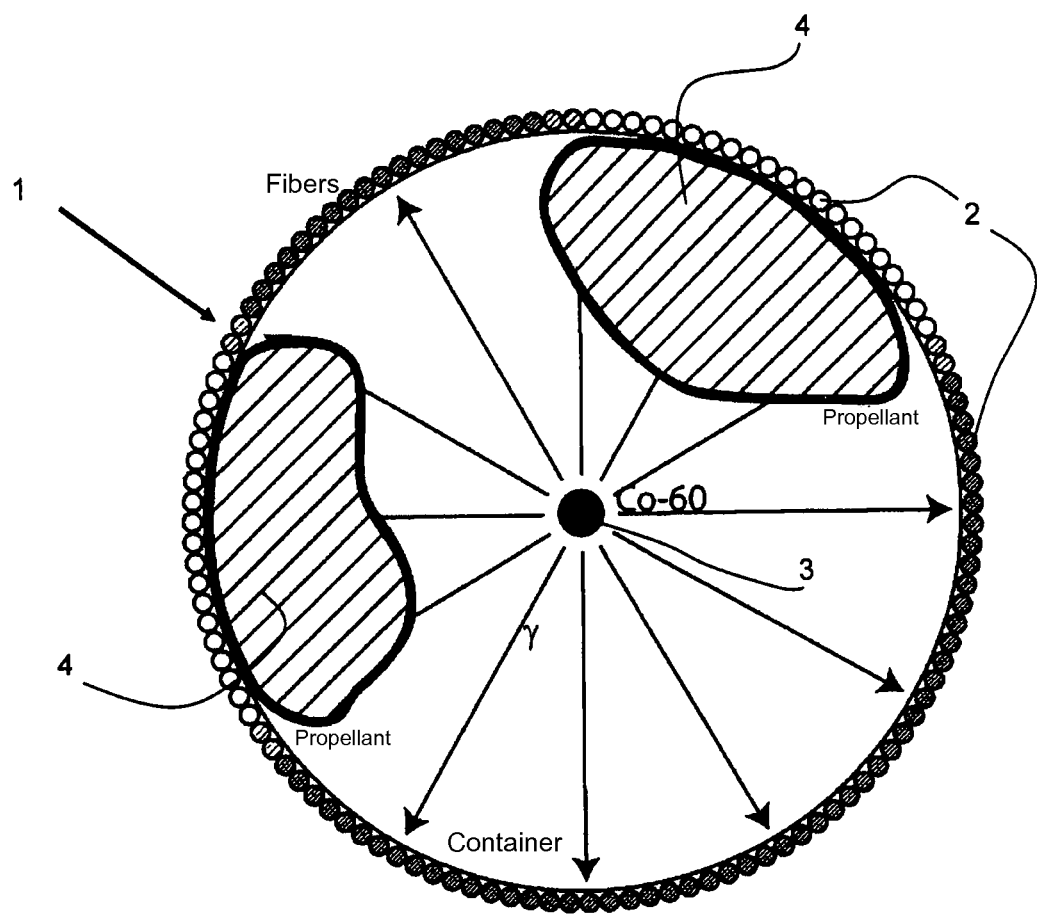
FIG. 2 is a vertical section through the propellant tank according to FIG. 1.
Figure 3:
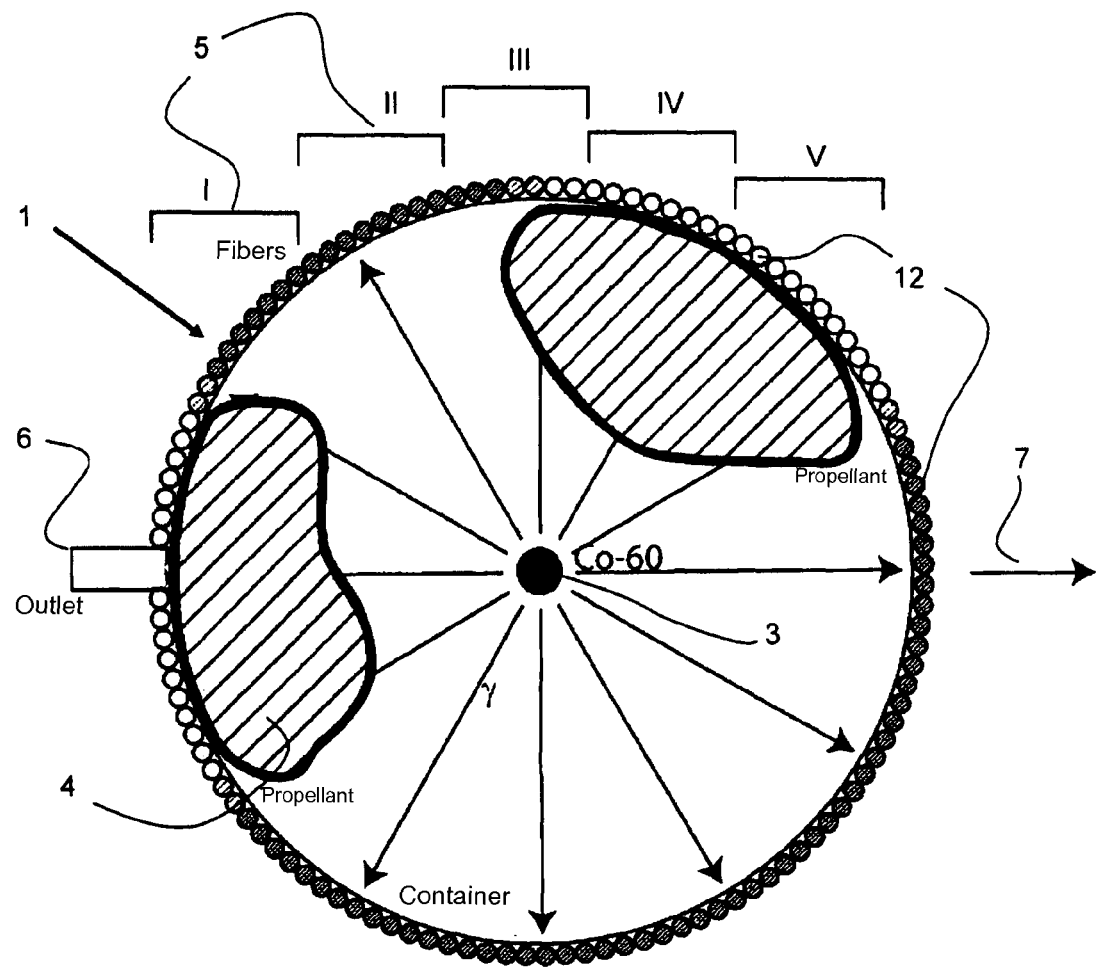
FIG. 3 is a vertical section through a second propellant tank with group-wise arranged fibers.

Thereby, those fibers at locations on the tank shell or tank wall, at which no propellant 4 is located in the tank interior space between the gamma radiation source 3 and the respective fiber 2, receive a relatively high gamma radiation influx and thus emit strong illumination signals (thickly cross-hatched in FIGS. 2 and 3). On the other hand, at locations at which propellant 4 is located between the gamma radiation source 3 and a respective fiber 2, the propellant 4 intercepts and absorbs some of the gamma radiation, so that a reduced gamma radiation influx impinges on the respective fiber 2, which thus emits a weaker light signal or no light signal (weakly or not cross-hatched in FIGS. 2 and 3).

In that regard, the temporal rate of the light pulses and therewith the electrical pulses is dependent on the following measured values:

The activity and the mass of the gamma source 3. This activity decreases exponentially over time. Therefore, the half-life time of the source is matched or adapted to the mission duration, which is given with a half-life time of approximately 5 years for a Co-60 source.

The background radiation of the surroundings. Because of this a blind calibrating test is conducted to subtract this background radiation.

The gamma absorption by the material, in this case the propellant 4, located between the source 3 and the respective scintillating glass fiber 2. Thus, the total determined gamma impingement count rate, and thus the scintillating light pulse count rate, is directly (inversely) dependent on how much propellant 4 is still located in the tank 1. In a simplest embodiment, there may be only a single fiber 2 and a single photodetector 8, if it is merely desired to determine the total or overall remaining quantity of propellant. However, by providing plural fibers 2 and plural photodetectors 8, it becomes possible to additionally determine the location(s) of remaining propellant in the tank interior space, as will be discussed next.

In the second embodiment illustrated in section in FIG. 3, the propellant tank 11 is wrapped or wound with plural fibers 12 arranged in cylindrically (or spherically) symmetrical sections 5 in the case of the example embodiment illustrated in this figure. Namely, each section I, II, III, IV and V represents a slice of the spherical tank shell and the fibers wound thereon, between respective planes extending normal to the winding axis of the winding of the fibers 12. There may be one fiber 12 and one photodetector 8 per section, or there may be plural fibers 12 and plural allocated photodetectors 8 per section. Thereby, a tomographic information becomes possible regarding in which area(s) of the propellant tank 11 the blob(s) of propellant 4 is (are) located.

Furthermore, in the embodiment illustrated in FIG. 3, the winding axis of the fibers 12 extends through the tank outlet 6, and thereby one of the fiber sections or detection sections can be provided wrapping around the tank outlet 6. In this manner it can be recognized whether propellant 4 is still located at the outlet 6. The remaining propellant 4 can be accelerated in the direction toward this outlet 6 by a thrust impulse extending in the opposite direction of the propellant outlet, indicated by an arrow 7 in FIG. 3, of the satellite. The fiber group I detects whether propellant is located at the outlet 6, while the remaining fiber groups II to V detect propellant residues located at successively farther areas in the propellant tank 11. The volume within the tank interior space that is detected by any given fiber group or section is shaped like a hollow cone or conical shell with an apex at the gamma radiation source 3 and extending to the base spanned by the fiber(s) 12 of the respective group or section. Thereby, the position of the propellant residues 4 in the tank can be determined and can be used for dosing or metering the so-called "fuel settling" thrust impulse 7. The precision of localization of the propellant residues depends on how many fiber groups are provided and how much area each group covers on the tank shell.

In the case of the example embodiments described here, the tank shell or tank wall of each propellant tank 1 is fabricated of a light metal, especially of aluminum or titanium or an alloy of aluminum or titanium, because with these materials the gamma radiation absorption in the tank wall is minimized, and therewith the radioactive emission activity of the gamma source can be designed as small as possible. Also, in the described and illustrated example embodiments, the fibers 2 are preferably wound onto an outside surface of the tank shell or tank wall, but instead the fibers could be arranged on the inner surface of the tank wall for example with a protective covering.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A propellant tank for containing a propellant having a liquid phase, comprising:
    a tank shell bounding a tank space for containing the propellant therein;
    scintillating glass fibers wound around said tank shell so as to loop entirely around said tank shell about a winding axis, which fibers are adapted to scintillate and emit light pulses in response to gamma radiation impinging thereon;
    a gamma radiation emitter arranged in a center of said tank space in said tank shell; and
    photosensors optically coupled to said scintillating glass fibers.

2. The propellant tank according to claim 1, wherein said tank shell and said tank space are spherical.

3. The propellant tank according to claim 1, wherein said gamma radiation emitter comprises a cobalt-60 source.

4. The propellant tank according to claim 1, wherein said scintillating glass fibers are wound around and onto an outside of said tank shell.

5. The propellant tank according to claim 1, wherein said tank shell is made of a lightweight metal.

6. The propellant tank according to claim 5, wherein said lightweight metal comprises aluminum.

7. The propellant tank according to claim 5, wherein said lightweight metal comprises titanium.

8. The propellant tank according to claim 1, wherein said photosensors comprise photodiodes.

9. The propellant tank according to claim 1, wherein said photosensors comprise avalanche photodiodes.

10. The propellant tank according to claim 1, wherein said photosensors are allocated one-to-one with said scintillating glass fibers whereby a respective one of said photosensors is optically coupled to a respective one of said scintillating glass fibers.

11. The propellant tank according to claim 1, further comprising a tank outlet communicating from said tank space out of said tank shell, wherein at least one of said photosensors is arranged at said tank outlet.

12. The propellant tank according to claim 1, further comprising a tank outlet communicating from said tank space out of said tank shell, wherein said winding axis extends coaxially through said tank outlet.

13. The propellant tank according to claim 1, wherein said scintillating glass fibers are grouped in sections.

14. The propellant tank according to claim 13, wherein neighboring ones of said sections are divided from one another by respective planes extending normal to said winding axis.

15. The propellant tank according to claim 1, further comprising a pre-amplifier arrangement connected to outputs of said photosensors, and evaluation electronics connected to an output of said pre-amplifier arrangement.

16. A propellant tank for containing a propellant having a liquid phase, comprising:
    a tank shell bounding a tank space for containing the propellant therein;
    scintillating glass fibers wound around said tank shell, which fibers are adapted to scintillate and emit light pulses in response to gamma radiation impinging thereon;
    a gamma radiation emitter arranged in a center of said tank space in said tank shell; and
    photosensors optically coupled to said scintillating glass fibers;
    wherein said scintillating glass fibers are wound cylindrically symmetrically around a central axis of said tank shell.

17. The propellant tank according to claim 1, further comprising a tank outlet communicating from said tank space out of said tank shell, wherein said scintillating glass fibers are wound around and onto an outside of said tank shell, and wherein said scintillating glass fibers entirely cover said outside of said tank shell except for an area of said tank outlet.

18. The propellant tank according to claim 1, wherein said scintillating glass fibers are wound tightly adjacent one another around said tank shell.

* * * * *